(12) United States Patent
Hanabusa et al.

(10) Patent No.: US 10,498,168 B2
(45) Date of Patent: Dec. 3, 2019

(54) WIRELESS POWER TRANSMISSION DEVICE

(71) Applicant: TDK Corporation, Tokyo (JP)

(72) Inventors: Kazuyoshi Hanabusa, Tokyo (JP); Takashi Urano, Tokyo (JP)

(73) Assignee: TDK CORPORATION, Tokyo (JP)

( * ) Notice: Subject to any disclaimer, the term of this patent is extended or adjusted under 35 U.S.C. 154(b) by 35 days.

(21) Appl. No.: 15/730,064

(22) Filed: Oct. 11, 2017

(65) Prior Publication Data

US 2018/0102674 A1    Apr. 12, 2018

(51) Int. Cl.
*H02J 50/10* (2016.01)
*H02M 3/335* (2006.01)
*H02J 50/80* (2016.01)

(52) U.S. Cl.
CPC .............. *H02J 50/10* (2016.02); *H02J 50/80* (2016.02); *H02M 3/33576* (2013.01)

(58) Field of Classification Search
None
See application file for complete search history.

(56) References Cited

U.S. PATENT DOCUMENTS

| 6,321,067 | B1 | 11/2001 | Suga et al. |
| 2014/0306656 | A1 | 10/2014 | Tabata et al. |
| 2015/0061578 | A1* | 3/2015 | Keeling ............... H02J 50/80 320/108 |
| 2015/0061580 | A1* | 3/2015 | Yamakawa ........... H01M 10/44 320/108 |
| 2016/0294195 | A1* | 10/2016 | Fei ........................ H02J 50/80 |
| 2016/0380485 | A1 | 12/2016 | Murayama |
| 2017/0317529 | A1* | 11/2017 | Smith .................... H02J 50/10 |
| 2018/0241301 | A1* | 8/2018 | Nagaoka ................ B60L 53/12 |

FOREIGN PATENT DOCUMENTS

| JP | 2011-217596 A | 10/2011 |
| JP | 2011223860 A | 11/2011 |
| JP | 2013-183548 | 9/2013 |
| JP | 2013-247704 | 9/2013 |

* cited by examiner

*Primary Examiner* — Jared Fureman
*Assistant Examiner* — Joel Barnett
(74) *Attorney, Agent, or Firm* — Young Law Firm, P.C.

(57) ABSTRACT

Disclosed herein is a wireless power transmission device includes a power transmitting transformer coupled between a power transmitting circuit and a power receiving circuit, and a signal transmitting transformer coupled between a signal generating circuit provided at the power receiving circuit side and a control circuit provided at the power transmitting circuit side. The frequency of an AC signal transmitted by the signal transmitting transformer is equal to or more than ten times the frequency of an AC voltage transmitted by the power transmitting transformer. The signal generating circuit converts the magnitude of the output voltage or output current of the power receiving circuit into a magnitude of an amplitude of the AC signal.

3 Claims, 4 Drawing Sheets

WIRELESS POWER TRANSMISSION DEVICE

BACKGROUND OF THE INVENTION

Field of the Invention

The present invention relates to a wireless power transmission device.

Description of Related Art

A wireless power transmission technology that feeds power without using a power cord or cable is now attracting attention. The wireless power transmission technology allows wireless power transmission from a power feeding side to a power receiving side and is thus expected to be applied to various products including transport machines such as electric train and electric cars, home electric appliances, electronic devices, wireless communication devices, toys, and industrial appliances.

In order to stabilize an output state on the power receiving side in such a wireless power transmission technology, it is necessary to feed back output information on the power receiving side to the power feeding side and to control AC power to be fed to a power feeding coil based on the output information. As a method for transmitting the output information on the power receiving side, there is known a method that utilizes induction coupling between transmission and receiving coils provided on the respective power receiving side and power feeding side.

For example, JP 2011-223860A proposes a wireless power transmission system including a signal generating circuit that generates an output signal representing an output voltage to be applied to a part of a load circuit by a signal frequency, a transmitting coil that transmits the output signal generated by the signal generating circuit to a power feeding side, a receiving coil that receives the output signal from the transmitting coil, and a signal adjusting circuit that DC-converts the output signal received by the receiving coil in accordance with the signal frequency.

Further, JP 2011-217596A proposes a wireless power transmission system including a signal generating circuit that generates an output signal representing an output voltage to be applied to a part of a load circuit by a duty ratio, a transmitting coil that transmits the output signal generated by the signal generating circuit to a power feeding side, a receiving coil that receives the output signal from the transmitting coil, and a signal adjusting circuit that DC-converts the output signal received by the receiving coil in accordance with the duty ratio.

However, in the technology disclosed in JP 2011-223860A, the frequency of the output signal transmitted from the transmitting coil varies with a change in the magnitude of the signal frequency, so that when the frequency of the output signal coincides with a noise frequency component of power transmission drive frequency, the waveform of the output signal is distorted, which may result in power control malfunction, and therefore, there is room for improvement in this respect.

In the technology disclosed in 2011-217596A, the duty ratio of the output signal transmitted from the transmitting coil is changed, so that the frequency of the output signal does not vary. However, a complicated circuit configuration is required to highly accurately control the duty ratio, thus increasing cost due to an increase in the number of parts and posing a problem in reliability.

SUMMARY

The present invention has been made in view of the above problems, and the object thereof is to reduce mutual influence between power transmission and signal transmission and to achieve stable power transmission and signal transmission simultaneously.

To solve the above problems, according to the present invention, there is provided a wireless power transmission device including a power transmitting circuit that converts an input DC voltage into an AC voltage and outputs the obtained AC voltage, a power transmitting coil that generates AC magnetic flux by the AC voltage, a power receiving coil that receives part of the AC magnetic flux to generate an AC voltage, a power receiving circuit that converts the AC voltage generated by the power receiving coil into a DC voltage, a signal generating circuit that generates an AC signal representing the magnitude of the output voltage or output current of the power receiving circuit, a signal transmitting coil that transmits the AC signal generated by the signal generating circuit to the signal transmitting side, a signal receiving coil that receives the AC signal transmitted from the signal transmitting coil, and a control circuit that controls an AC voltage output from the power transmitting circuit based on the AC signal received by the signal receiving coil. The frequency of the AC signal is equal to or more than ten times the frequency of the AC voltage output from the power transmitting circuit. The signal generating circuit converts the magnitude of the output voltage or output current of the power receiving circuit into the magnitude of the amplitude of the AC signal.

BRIEF DESCRIPTION OF THE DRAWINGS

The above and other objects, features and advantages of this invention will become more apparent by reference to the following detailed description of the invention taken in conjunction with the accompanying drawings, wherein.

DETAILED DESCRIPTION OF THE EMBODIMENTS

Preferred embodiments of the present invention will now be explained in detail with reference to the drawings.

Figure 1:
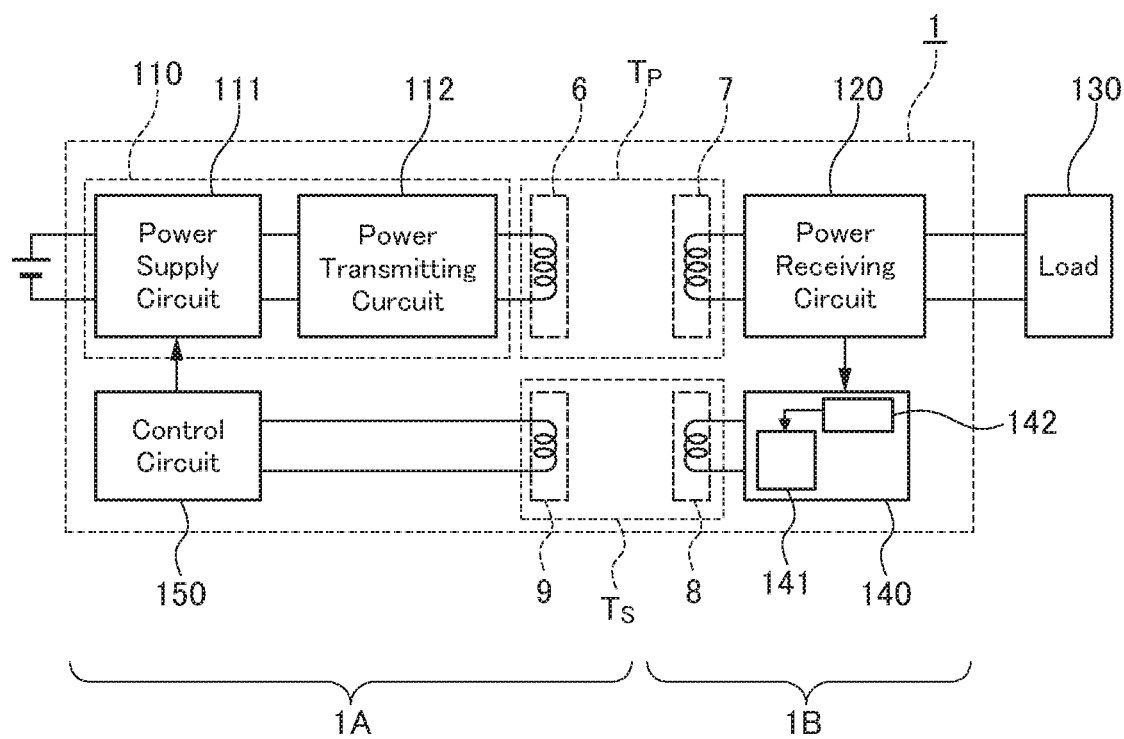
FIG. 1 is a block diagram schematically illustrating a configuration of a wireless power transmission device according to an embodiment of the present invention.

FIG. 1 is a block diagram schematically illustrating a configuration of a wireless power transmission device according to an embodiment of the present invention.

As illustrated in FIG. 1, a wireless power transmission device 1 is constituted of a combination of a power transmitting unit 1A and a power receiving unit 1B. The wireless power transmission device 1 is configured to transmit electric power from the power transmitting unit 1A to the power receiving unit 1B by wireless.

The power transmitting unit 1A includes a power transmitting circuit 110, a power transmitting coil 6, a signal receiving coil 9, and a control circuit 150. The power transmitting circuit 110 converts an input DC voltage into an AC voltage of, e.g., 100 kHz and outputs it. The power transmitting coil 6 generates an AC magnetic flux using the AC voltage. The signal receiving coil 9 receives an AC signal transmitted from the power receiving unit 1B. The control circuit 150 controls the AC voltage output from the power transmitting circuit 110 based on the AC signal received by the signal receiving coil 9.

The power receiving unit 1B includes a power receiving coil 7, a power receiving circuit 120, a signal generating circuit 140, and a signal transmitting coil 8. The power receiving coil 7 receives at least a part of the AC magnetic flux generated by the power transmitting coil 6 to generate an AC voltage. The power receiving circuit 120 converts the AC voltage generated in the power receiving coil 7 into a DC voltage of, e.g., 24 V. The signal generating circuit 140 generates an AC signal representing the magnitude of an output voltage or an output current of the power receiving circuit 120. The signal transmitting coil 8 transmits the AC signal to the signal receiving coil 9. The output voltage of the power receiving circuit 120 is supplied to, e.g., a load 130.

The power transmitting circuit 110 includes a power supply circuit 111 and a voltage converting circuit 112. The power supply circuit 111 converts an input DC voltage into a predetermined DC voltage. The voltage converting circuit 112 converts the predetermined DC voltage output from the power supply circuit 111 into an AC voltage of, e.g., 100 kHz. The control circuit 150 controls the magnitude of the predetermined DC voltage to be output from the power supply circuit 111 based on the AC signal received by the signal receiving coil 9 to thereby control the AC voltage output from the power transmitting circuit 110. Therefore, the AC voltage output from the voltage converting circuit 112 is not changed. That is, the power transmitting frequency that is a frequency of the AC voltage output from the power transmitting circuit 110 can be fixed.

The signal generating circuit 140 includes an oscillating circuit 141 and a power supply voltage generating circuit 142. The oscillating circuit 141 outputs an AC signal of, e.g., 10 MHz. The power supply voltage generating circuit 142 generates a power supply voltage for the oscillating circuit 141 in accordance with the magnitude of the output voltage or output current of the power receiving circuit 120. The power supply voltage generating circuit 142 controls the power supply voltage for the oscillating circuit 141 based on a difference between the output voltage or output current of the power receiving circuit 120 and a target value.

As described above, an output from the power receiving unit 1B is fed back to the power transmitting unit 1A through the signal transmitting coil 8 and the signal receiving coil 9, whereby the output power from the power receiving unit 1B can be controlled to be constant.

A combination of the power transmitting coil 6 and the power receiving coil 7 constitutes a power transmitting transformer $T_P$, and a combination of the signal transmitting coil 8 and the signal receiving coil 9 constitutes a signal transmitting transformer $T_S$. When the signal transmitting transformer $T_S$ and the power transmitting transformer $T_P$ are coaxially disposed in the same case or disposed very close to each other for miniaturization and improvement of performance of the wireless power transmission device 1, magnetic flux generated by one of the power transmitting transformer $T_P$ and signal transmitting transformer $T_S$ may influence magnetic flux of the other one thereof to degrade signal transmission quality or power transmission quality. Thus, in the present embodiment, mutual influence between power transmission and signal transmission is reduced by setting a signal transmission frequency to equal to or more than ten times a power transmission frequency.

Figure 2:
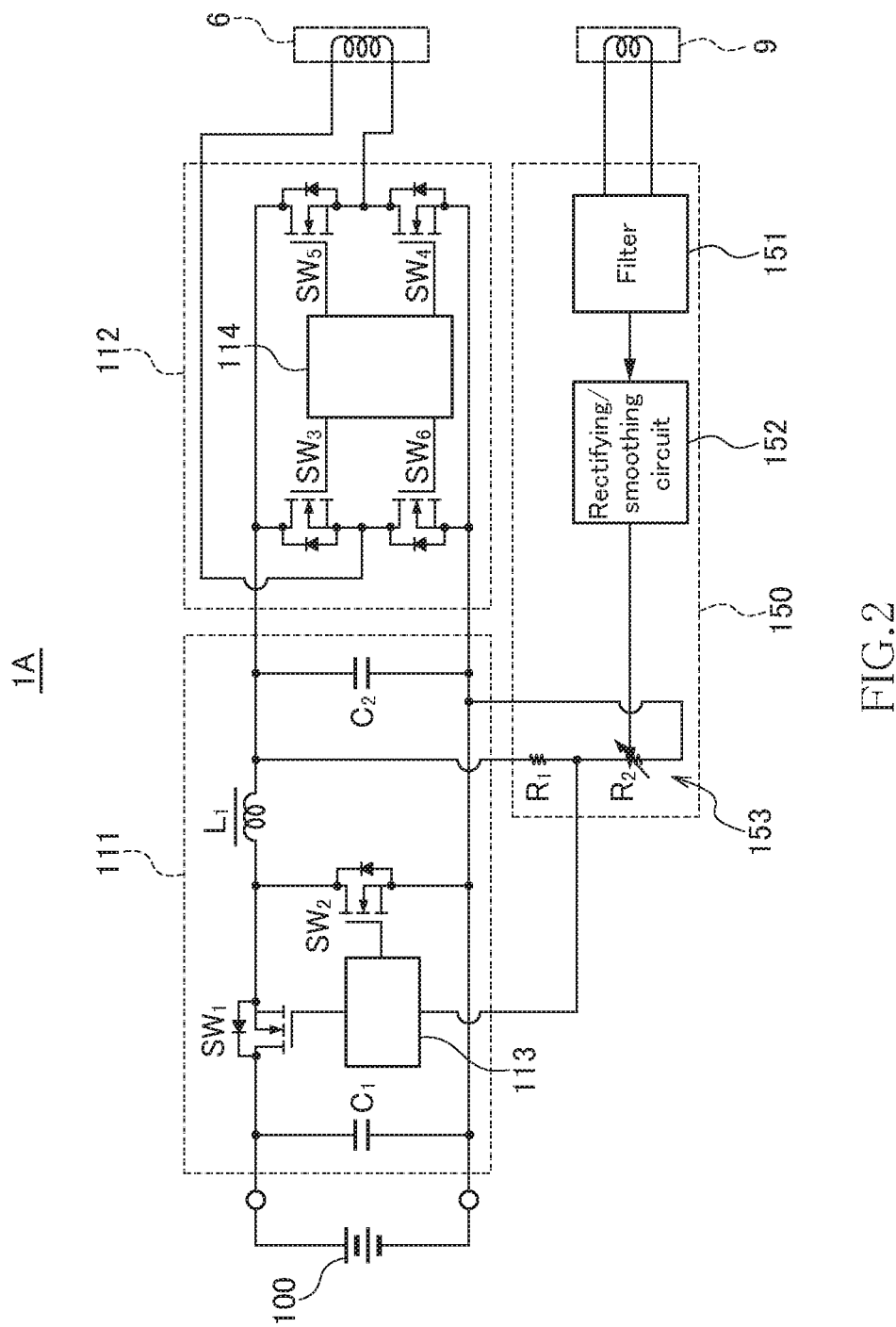
FIG. 2 is a block diagram illustrating in detail an example of the circuit configuration of the power transmitting unit shown in FIG. 1.

FIG. 2 is a block diagram illustrating in detail an example of the circuit configuration of the power transmitting unit 1A.

As illustrated in FIG. 2, the power supply circuit 111 on the power transmitting unit 1A is a non-insulated step-down converter and includes a first switching element $SW_1$ connected in series to one of a pair of balanced lines extending from a DC voltage source 100, a second switching element $SW_2$ connected to the balanced line in parallel, a power supply circuit switching element control part 113 that controls ON/OFF state of the first and second switching elements $SW_1$ and $SW_2$, a bypass capacitor $C_1$ connected to the pre-stage of the first and second switching elements $SW_1$ and $SW_2$ in parallel, and a low-pass filter composed of a series inductor $L_1$ and a parallel capacitor $C_2$ provided at the post-stage of the first and second switching elements $SW_1$ and $SW_2$. The power supply circuit switching element control part 113 controls the ON/OFF period of the first and second switching elements $SW_1$ and $SW_2$ based on a control voltage from the control circuit 150 to thereby control the level of a DC voltage to be supplied to a post-stage voltage converting circuit 112.

The voltage converting circuit 112 includes a bridge circuit composed of third to sixth switching elements $SW_3$ to $SW_6$ and a voltage converting circuit switching element control part 114 that controls ON/OFF state of the third to sixth switching elements $SW_3$ to $SW_6$. A predetermined DC voltage supplied from the power supply circuit 111 is converted into an AC voltage of, e.g., 100 kHz and then input to the power transmitting coil 6.

The control circuit 150 includes a filter 151, a rectifying/smoothing circuit 152, and a variable voltage dividing circuit 153. An AC signal received by the signal receiving coil 9 is subjected to noise removal by the filter 151, then rectified and smoothed by the rectifying/smoothing circuit 152, and is input to the variable voltage dividing circuit 153. The variable voltage dividing circuit 153 is composed of a series circuit of a resistor $R_1$ and a variable resistor $R_2$ connected to the balanced line in parallel. The magnitude of the variable resistor $R_2$ varies in accordance with an output voltage level of the rectifying/smoothing circuit 152. When the output voltage level of the rectifying/smoothing circuit 152 is high, the resistance value of the variable resistor $R_2$ becomes large, so that a large control voltage is supplied to the power supply circuit switching element control part 113. On the other hand, when the output voltage level of the rectifying/smoothing circuit 152 is low, the resistance value of the variable resistor $R_2$ becomes small, so that a small control voltage is supplied to the power supply circuit switching element control part 113. The power supply circuit switching element control part 113 controls switching in accordance with the control voltage level to thereby control the magnitude of a predetermined DC voltage to be supplied to the voltage converting circuit 112.

Figure 3:
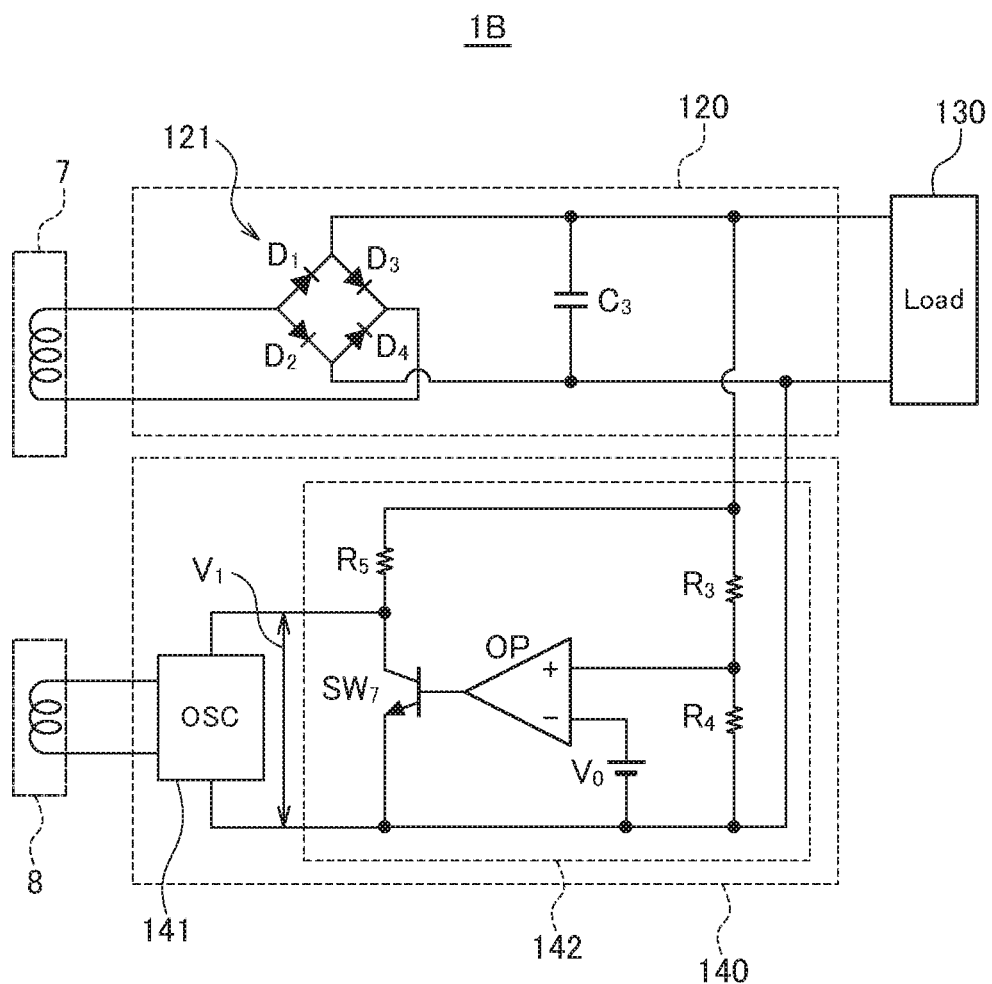
FIG. 3 is a block diagram illustrating in detail an example of the circuit configuration of the power receiving unit shown in FIG. 1.

FIG. 3 is a block diagram illustrating in detail an example of the circuit configuration of the power receiving unit 1B.

As illustrated in FIG. 3, the power receiving circuit 120 of the power receiving unit 1B includes a combination of a bridge type full wave rectifying circuit 121 having rectifying diodes $D_1$ to $D_4$ and a smoothing capacitor $C_3$ and is configured to smooth and rectify an AC voltage from the power receiving coil 7 to generate a DC voltage of, e.g., 24 V and supply the DC voltage to the load 130.

The signal generating circuit 140 includes an oscillating circuit 141 that outputs an AC signal of, e.g., 10 MHz and a power supply voltage generating circuit 142 that generates a power supply voltage of the oscillating circuit 141 in accordance with the magnitude of an output voltage of the power receiving circuit 120. The power supply voltage generating circuit 142 includes a voltage dividing resistors $R_3$ and $R_4$, an operation amplifier OP, a resistor $R_5$, and a switching element $SW_7$ and is configured to control a power supply voltage $V_1$ of the oscillating circuit 141 based on a difference between an output voltage (value divided by the resistors $R_3$ and $R_4$) of the power receiving circuit 120 and a target value $V_0$. Specifically, when the output voltage of the power receiving circuit 120 is higher than the target value $V_0$, the ON-resistance of the switching element $SW_7$ is decreased. Thus, the power supply voltage $V_1$ to be supplied to the oscillating circuit 141 is decreased, so that the amplitude of the AC signal to be output from the oscillating circuit 141 is decreased. On the other hand, when the output voltage of the power receiving circuit 120 is lower than the target value $V_0$, the ON-resistance of the switching element $SW_7$ is increased. Thus, the power supply voltage $V_1$ to be supplied to the oscillating circuit 141 is increased, so that the amplitude of the AC signal to be output from the oscillating circuit 141 is increased. In this manner, the AC signal of 10 MHz that has been subjected to amplitude modulation in accordance with the output voltage level of the power receiving circuit 120 is output from the oscillating circuit 141.

As described above, when the output voltage of the power receiving circuit 120 is higher than 24 V, the peak value of a carrier signal generated by the oscillating circuit 141 is decreased. Then, the peak value of a carrier signal is decreased also on the signal receiving coil 9 side and, thus, the smoothed/rectified DC voltage is decreased, so that the control circuit 150 issues a control instruction to decrease the output voltage of the power supply circuit 111. As a result, the output voltage from the power transmitting circuit 110 is decreased, allowing the output voltage of the power receiving circuit 120 to be decreased.

On the other hand, when the output voltage of the power receiving circuit 120 is lower than 24 V, the peak value of a carrier signal generated by the oscillating circuit 141 is increased. Then, the peak value of a carrier signal is increased also on the signal receiving coil 9 side and, thus, the smoothed/rectified DC voltage is increased, so that the control circuit 150 issues a control instruction to increase the output voltage of the power supply circuit 111. As a result, the output voltage from the power transmitting circuit 110 is increased, allowing the output voltage of the power receiving circuit 120 to be increased.

Figure 4:
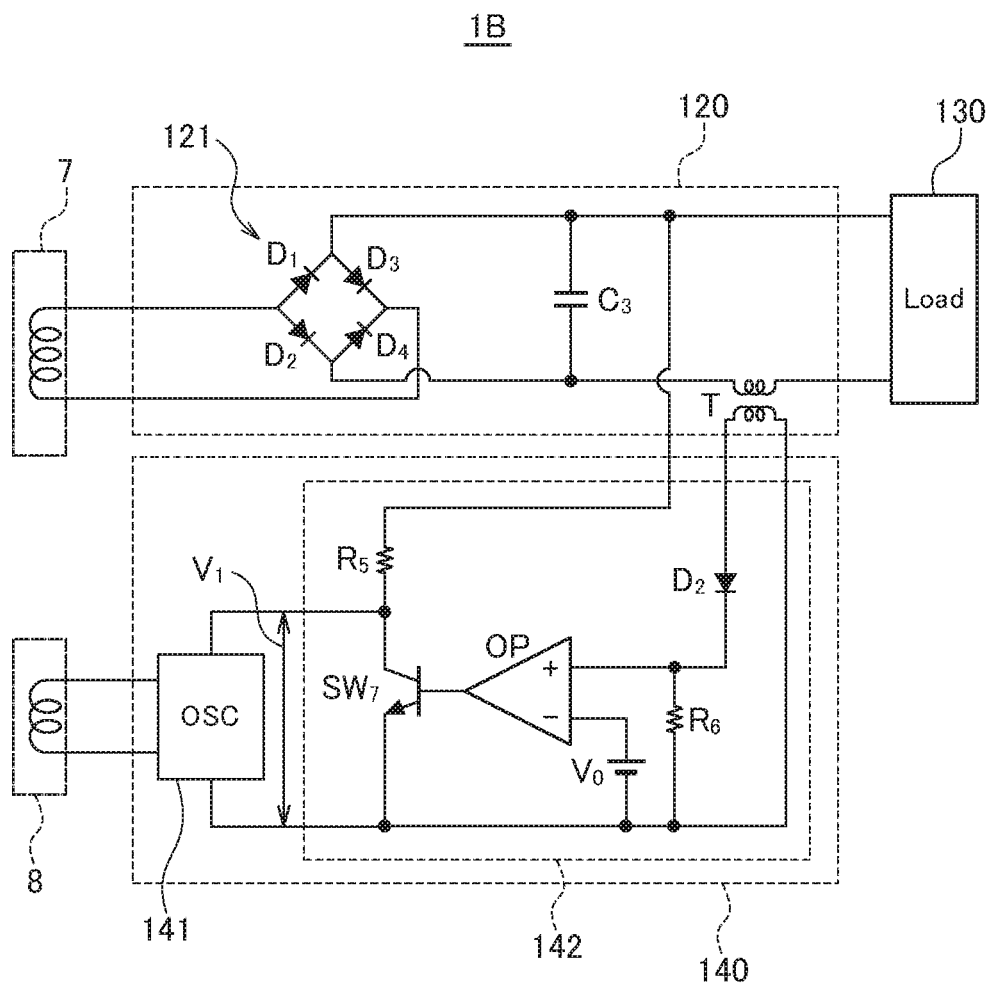
FIG. 4 is a block diagram illustrating in detail another example of the circuit configuration of the power receiving unit shown in FIG. 1.

FIG. 4 is a block diagram illustrating in detail another example of the circuit configuration of a power receiving unit 1B.

The power receiving unit 1B of FIG. 4 differs from the power receiving unit 1B of FIG. 3 in that the power supply voltage generating circuit 142 is connected to the output line of the power receiving circuit 120 through a transformer T and a diode $D_2$ and that the power supply voltage of the oscillating circuit 141 is generated in accordance with the magnitude of the output current of the power receiving circuit 120. A voltage proportional to the magnitude of the output current of the power receiving circuit 120 is obtained from the voltage applied to a resistor $R_6$ connected to the transformer T, and the power supply voltage generating circuit 142 controls the power supply voltage $V_1$ of the oscillating circuit 141 based on a difference between the voltage proportional to the magnitude of the output current of the power receiving circuit 120 and the target value $V_0$. As a result, an AC signal of 100 MHz that has been subjected to amplitude modulation in accordance with the output current level of the power receiving circuit 120 is output from the oscillating circuit 141.

In the present embodiment, the frequency of the AC voltage for power transmission is 100 kHz, while the frequency of the AC signal for signal transmission is 10 MHz which is 100 times the frequency of the AC voltage for power transmission. The frequency of the AC signal for signal transmission is preferably equal to or more than 10 times the frequency of the AC voltage for power transmission. When the frequency of the AC signal for signal transmission is equal to or more than 10 times the frequency of the AC voltage for power transmission, it is possible to prevent a harmonic of the AC voltage for power transmission from distorting an output signal waveform as noise for the AC signal, thereby avoiding interference between the power transmission side and the signal transmission side, which can ensure transmission quality of the AC signal.

The oscillating circuit 141 merely oscillates at a constant frequency, and the amplitude of the output signal of the oscillating circuit 141 is modulated by increasing and decreasing the power supply voltage $V_1$ of the oscillating circuit 141. That is, control information indicating the magnitude of the output voltage or output current of the power receiving circuit 120 is superimposed by amplitude modulation of the carrier signal generated by the oscillating circuit 141. With this configuration, it is possible to achieve amplitude modulation easily by changing the power supply voltage itself of the oscillating circuit 141 and to realize signal transmission with a simple (reduced number of components), low-cost, and highly reliable configuration.

As described above, the wireless power transmission device 1 according to the present embodiment can reduce mutual influence between power transmission and signal transmission by setting the frequency of an AC signal to equal to or more than ten times the frequency of an AC voltage. Further, the magnitude of the output voltage or output current of the power receiving circuit 120 is converted into the magnitude of the amplitude of an AC signal, so that influence of a noise frequency component of the frequency (frequency of an AC voltage to be output from the power transmitting circuit) of power transmission coinciding with the frequency of the AC signal can be suppressed, whereby power control malfunction can be prevented. This allows mutual influence between power transmission and signal transmission to be reduced to thereby achieve stable power transmission and signal transmission simultaneously. In addition, the power transmitting unit 1A that receives the AC signal adjusts power to be transmitted to the power receiving unit 1B by increasing and decreasing the output voltage of the power supply circuit 111, thus eliminating the need to perform complicated control for the voltage converting circuit 112. Further, in the wireless power transmission device 1 according to the present embodiment, the frequency of a signal transmission AC signal and the frequency of a power transmission AC voltage can each be fixed to a specific frequency, whereby mutual influence between power transmission and signal transmission can be reduced even further.

It is apparent that the present invention is not limited to the above embodiments, but may be modified and changed without departing from the scope and spirit of the invention.

For example, in the above embodiment, a non-insulated step-down converter is used as the power supply circuit; however, the present invention is not limited to this, and various types of power supply circuits can be used. However, using the non-insulated step-down converter allows a low-cost and highly efficient power supply circuit to be obtained.

Further, in the above embodiment, the power transmission frequency is set to 100 kHz, and signal transmission frequency is to 10 MHz; however, the present invention is not limited to this combination, and various combination may be possible as long as the signal transmission frequency is equal to or more than ten times the power transmission frequency.

As described above, according to the present embodiment, there is provided a wireless power transmission device including a power transmitting circuit that converts an input DC voltage into an AC voltage and outputs the obtained AC voltage, a power transmitting coil that generates AC magnetic flux by the AC voltage, a power receiving coil that receives part of the AC magnetic flux to generate an AC voltage, a power receiving circuit that converts the AC voltage generated by the power receiving coil into a DC voltage, a signal generating circuit that generates an AC signal representing the magnitude of the output voltage or output current of the power receiving circuit, a signal transmitting coil that transmits the AC signal generated by the signal generating circuit to the signal transmitting side, a signal receiving coil that receives the AC signal transmitted from the signal transmitting coil, and a control circuit that controls an AC voltage output from the power transmitting circuit based on the AC signal received by the signal receiving coil. The frequency of the AC signal is equal to or more than ten times the frequency of the AC voltage output from the power transmitting circuit. The signal generating circuit converts the magnitude of the output voltage or output current of the power receiving circuit into the magnitude of the amplitude of the AC signal.

According to the present embodiment, influence that one of power transmission and signal transmission has on the other can be reduced. Further, an AC signal that has been amplitude-modulated in accordance with the magnitude of the output voltage or output current of the power receiving circuit is used, so that influence of a noise frequency component of the frequency (frequency of an AC voltage to be output from the power transmitting circuit) of power transmission coinciding with the frequency of the AC signal can be suppressed. Thus, mutual influence between power transmission and signal transmission can be reduced to thereby achieve stable power transmission and signal transmission simultaneously.

In the present embodiment, it is preferable that the signal generating circuit includes an oscillating circuit that outputs the AC signal and a power supply voltage generating circuit that generates a power supply voltage of the oscillating circuit in accordance with the magnitude of the output voltage or output current of the power receiving circuit and that the power supply voltage generating circuit controls the power supply voltage based on a difference between the output voltage or output current of the power receiving circuit and a target value. With this configuration, the frequency of the AC signal to be output from the signal generating circuit is not changed, and the frequency of the signal transmission AC signal can be fixed to a specific frequency, so that mutual influence between power transmission and signal transmission can be reduced. Thus, stable power transmission and signal transmission can be achieved simultaneously with a simple circuit.

In the present embodiment, it is preferable that the power transmitting circuit includes a power supply circuit that converts the input DC voltage into a predetermined DC voltage and a voltage converting circuit that converts the predetermined DC voltage output from the power supply circuit into the AC voltage and that the control circuit controls the AC voltage output from the power transmitting circuit by controlling the predetermined DC voltage output from the power supply circuit based on the AC signal received by the signal receiving coil. With this configuration, the frequency of the AC voltage output from the voltage converting circuit is not changed, and the frequency of the power transmission frequency (frequency of the AC voltage output from the power transmitting circuit) can be fixed to a specific frequency, so that mutual influence between power transmission and signal transmission can be reduced further.

In the present embodiment, the power supply circuit is preferably a non-insulated step-down converter. Using the non-insulated step-down converter allows a low-cost and highly efficient power supply circuit to be obtained.

According to the present embodiment, there can be provided a wireless power transmission device capable of reducing mutual influence between power transmission and signal transmission and achieving stable power transmission and signal transmission simultaneously.

What is claimed is:

1. A wireless power transmission device comprising:
    a power transmitting unit configured to transmit electric power; and
    a power receiving unit configured to receive the electric power transmitted from the power transmitting unit, wherein
    the power transmitting unit includes:
        a power transmitting circuit configured to convert an input DC voltage into a first AC voltage;
        a power transmitting coil configured to generate an AC magnetic flux based on the first AC voltage;
        a signal receiving coil configured to receive an AC signal transmitted from the power receiving unit; and
        a control circuit that controls the first AC voltage based on the AC signal received by the signal receiving coil,
    the power receiving unit including:
        a power receiving coil configured to receive at least a part of the AC magnetic flux to generate a second AC voltage;
        a power receiving circuit configured to convert the second AC voltage into an output DC voltage;
        a signal generating circuit configured to generate the AC signal representing a magnitude of the output voltage or output current of the power receiving circuit; and
        a signal transmitting coil configured to transmit the AC signal generated by the signal generating circuit,
    the signal generating circuit including:
        an oscillating circuit configured to output the AC signal; and
        a power supply voltage generating circuit configured to generate a power supply voltage of the oscillating circuit in accordance with the magnitude of the output voltage or output current of the power receiving circuit, a frequency of the AC signal being equal to or more than ten times a frequency of the first AC voltage, and the signal generating circuit being configured to convert the magnitude of the output voltage or output current of the power receiving circuit into a magnitude of an amplitude of the AC signal, and the power supply voltage generating circuit being configured to control the power supply voltage based on a difference between the output voltage or output current of the power receiving circuit and a target value.

2. The wireless power transmission device as claimed in claim 1, wherein the power transmitting circuit includes:
a power supply circuit configured to convert the input DC voltage into a predetermined DC voltage; and
a voltage converting circuit configured to convert the predetermined DC voltage into the first AC voltage,
wherein the control circuit controls the first AC voltage by controlling the predetermined DC voltage output from the power supply circuit.

3. The wireless power transmission device as claimed in claim 2, wherein the power supply circuit comprises a non-insulated step-down converter.

* * * * *

UNITED STATES PATENT AND TRADEMARK OFFICE
CERTIFICATE OF CORRECTION

PATENT NO. : 10,498,168 B2
APPLICATION NO. : 15/730064
DATED : December 3, 2019
INVENTOR(S) : Kazuyoshi Hanabusa and Takashi Urano Page 1 of 1

It is certified that error appears in the above-identified patent and that said Letters Patent is hereby corrected as shown below:

On the Title Page

Please insert Item (30):
--Foreign Application Priority Data
Oct 11 2016 [JP] 2016-200336--

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*